United States Patent [19]
Fujita et al.

[11] Patent Number: 5,448,535
[45] Date of Patent: Sep. 5, 1995

[54] HEAD POSITION CONTROL DEVICE

[75] Inventors: Goro Fujita, Kanagawa; Kiyoshi Toyota; Shoji Iwaasa, both of Tokyo; Hiroshi Kashiwagi, Kanagawa, all of Japan

[73] Assignee: Sony Corporation, Tokyo, Japan

[21] Appl. No.: 209,599

[22] Filed: Mar. 10, 1994

Related U.S. Application Data

[63] Continuation of Ser. No. 28,717, Mar. 9, 1993, abandoned, which is a continuation of Ser. No. 763,445, Sep. 19, 1991, abandoned.

[30] Foreign Application Priority Data

Sep. 25, 1990 [JP] Japan .................. 2-251793
Mar. 13, 1991 [JP] Japan .................. 3-073931

[51] Int. Cl.⁶ ............................................. G11B 7/00
[52] U.S. Cl. .................... 369/44.11; 369/13; 369/120
[58] Field of Search .............. 369/44.11, 14, 15, 43, 369/44.14, 44.41, 44.42, 44.32, 13, 110, 120, 121, 122; 360/114, 59

[56] References Cited

U.S. PATENT DOCUMENTS

| | | | |
|---|---|---|---|
| 4,954,904 | 9/1990 | Goor | 369/44.11 |
| 4,972,337 | 11/1990 | Eguchi et al. | 360/114 |
| 5,031,055 | 7/1991 | Yanagisawa | 369/14 |
| 5,039,202 | 8/1991 | Koyama et al. | 369/44.11 |
| 5,111,440 | 5/1992 | Mathildus et al. | 360/114 |
| 5,162,661 | 11/1992 | Sato et al. | 250/201.5 |
| 5,216,649 | 6/1993 | Koike et al. | 369/44.37 |

FOREIGN PATENT DOCUMENTS 0336687 10/1989 European Pat. Off. .
0447713 9/1991 European Pat. Off. .

OTHER PUBLICATIONS

Patent Abstracts of Japan, vol. 13, No. 590 (P-984) 6 Oct. 1989 & JP-A-1 251 359 (Seiko Epson Corp) 28 Mar. 1988–abstract.
Patent Abstracts of Japan, vol. 9, No. 157 (P-369 (1880) 2 Jul. 1985 & JP-A-60 032 143 (NEC Home Electronics K K) 19 Feb. 1985–abstract.
Patent Abstracts of Japan, vol. 6 No. 5 (P-97) (883) 13 Jan. 1982 & JP-A-56 130 603 (Ricoh K K) 13 Oct. 1981–abstract.

*Primary Examiner*—Scott J. Sugarman
*Assistant Examiner*—Nabil Hindi
*Attorney, Agent, or Firm*—Limbach & Limbach; Philip M. Shaw, Jr.

[57] ABSTRACT

A head position controlling device in which the head position may be controlled accurately even with a magneto-optical disc having regions with different reflectance values. A gap sensor consisting of a light emitting element 5 and light receiving elements 6 and 7 are arrayed along the track direction of a magneto-optical disc to prevent unequilibrium in the volume of received light at the light receiving elements 6 and 7.

5 Claims, 10 Drawing Sheets

HEAD POSITION CONTROL DEVICE

This is a continuation of application Ser. No. 08/028,717, filed Mar. 9, 1993, abandoned, which is a continuation of application Ser. No. 07/763,445, filed on Sep. 19, 1991, abandoned.

BACKGROUND OF THE INVENTION

1. Field of the Invention

This invention relates to a head position controlling device advantageously employed in, for example, a magneto-optical disk apparatus.

2. Related Art

In magneto-optical disc apparatus of a magnetic field modulation system in which modulation signals based on information signals to be recorded on a magneto-optical disc are applied on a magnetic field generating device adapted for generating an external magnetic field, or of an optical modulation system in which the aforementioned modulation signals are applied on a laser light source side, there is provided a controlling device whereby, for assuring satisfactory writing and erasure of information signals on or from the magneto-optical disc, the relative distance between a magnetic field generating coil (magnetic head) and a magneto-optical disc is maintained at a constant value. This type of the controlling device has been proposed by the present assignee in, for example, the JP Utility Model Application No.1-46200 (1989).

This controlling device is shown in FIG. 1 wherein a gap sensor including a light-emitting element 54 for irradiating a surface 51a of a magneto-optical disc 51 facing a magnetic field generating coil 52 with a diffused light and a pair of light-receiving elements 55, 56 for receiving the diffused light from the light-emitting element 54 reflected from the facing surface 51a and for generating an output corresponding to the volume of the received light is embedded in a bobbin 53 in which there is also embedded the magnetic field generating coil 52 for applying the magnetic field on the magneto-optical disc 51.

A differential amplifier 57 for detecting the level difference of output voltages of the light-receiving elements 55, 56 is connected to these light-receiving elements 55, 56, and a control current corresponding to an output voltage of the differential amplifier 57 is applied via a driver circuit 58 to a driving coil 59 provided about the outer periphery of the bobbin 53, so that the magnetic field generating coil 52 is driven in a direction towards and away from the magneto-optical disc 51, as shown by an arrow T in FIG. 1.

That is, with the above described controlling apparatus, a relative distance d between the magnetic field generating coil 52 and the magneto-optical disc 51 is adapted to be maintained constant by performing a servo control operation so that, with the relative distance between the coil 52 and the disc 51 when the output voltages from the light-receiving elements 55, 56, is reduced to zero, that is, the relative distance between the coil 52 and the disc 51 when the level difference between these light-receiving elements 55 and 56 is reduced to zero, as a reference, the level difference between the output voltages from the light-receiving elements 55 and 56 will always be equal to zero.

However, it may occur that,if the light-emitting element 54 and the light-receiving elements 55 and 56 are arrayed along the radius of the magneto-optical disc 51, the servo control operation cannot be applied. For example, if the light-emitting element 56 is positioned in opposition to a ROM (PROM) region having a preformed pit row(s) and the remaining light-emitting element 55 is positioned in opposition to a RAM region (a data-recording region), the reflectance in the ROM region is drastically lowered as compared with that in the RAM region, so that, even though the relative distance d remains the same, the level difference of the output voltages from the light-receiving elements 55, 56 is increased suddenly to shift the zero-crossing points of the output voltages to render it impossible to apply a servo for reducing the level difference to zero.

For combatting such drawback, the present assignee has previously proposed an arrangement in which a gain-modifying amplifier is connected between the light-receiving element 56 and the differential amplifier 57 exhibiting a lower output voltage level and the output voltage level from the light-receiving element 56 is raised for correcting the equilibrium of the output voltages from the light-emitting elements 55 and 56 to enable a servo to be applied for reducing the output voltage level difference to zero.

However, with the proposed method, circuit construction is complicated due to provision of the amplifier so that inexpensive devices cannot be provided.

OBJECT AND SUMMARY OF THE INVENTION

It is a principal object of the present invention to provide a controlling device in which the relative distance between the head and the disc may be maintained constant even with a disc having different reflectance values within the same plane without complicating the circuit construction.

According to the present invention, there is provided a position controlling device for maintaining a constant relative position with respect to a magneto-optical disc of an external magnetic field generating device adapted for supplying an external magnetic field for recording information signals on a magneto-optical disc or erasing information signals recorded on the magneto-optical disc, said position controlling device comprising light emitting means for illuminating a facing surface of the external magnetic field generating device with a diffused light, a pair of light receiving elements for receiving the diffused light once irradiated on and reflected from the facing surface of the magneto-optical disc from said light emitting means and for generating an output corresponding to the volume of the received light, and driving means for driving said external magnetic field generating device in a direction normal to the surface of the magneto-optical disc responsive to an output from said pair of light receiving means, characterized in that said light emitting means and said light receiving means are arrayed along the direction of the same track of the magneto-optical disc so that the length of a light path of the diffused light reflected from the facing surface of the magneto-optical disc to one of the light receiving means is longer than that to the other of the light receiving means.

BRIEF DESCRIPTION OF THE DRAWINGS

FIG. 9 is a graph showing output characteristics of the light-receiving elements shown in FIG. 7.

FIG. 10 is a graph showing output characteristics of the deferential amplifier shown in FIG. 7.

EMBODIMENTS

Figure 1:
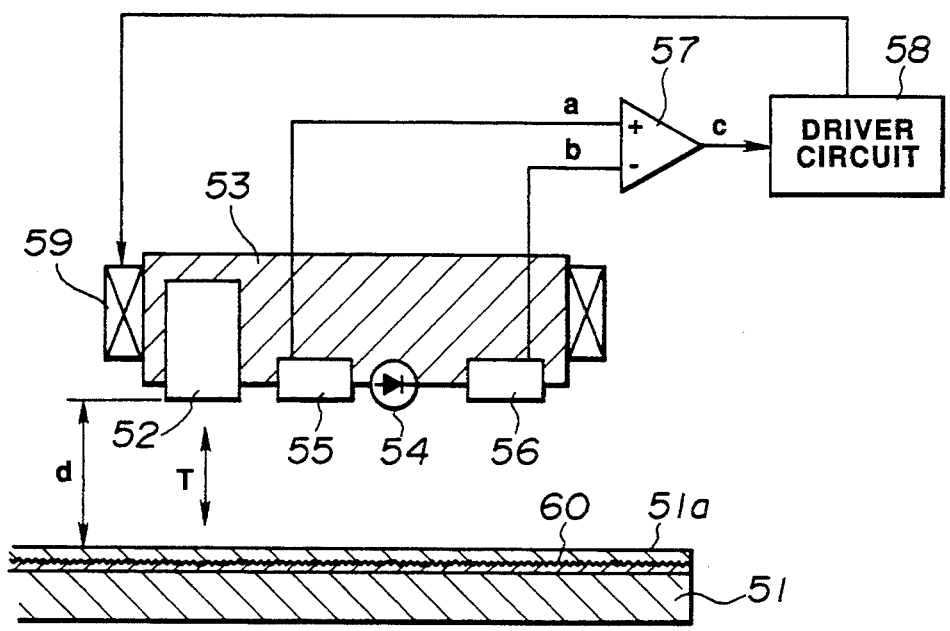
FIG. 1 is a schematic view showing the construction of a typical conventional head position controlling device.
Figure 2:
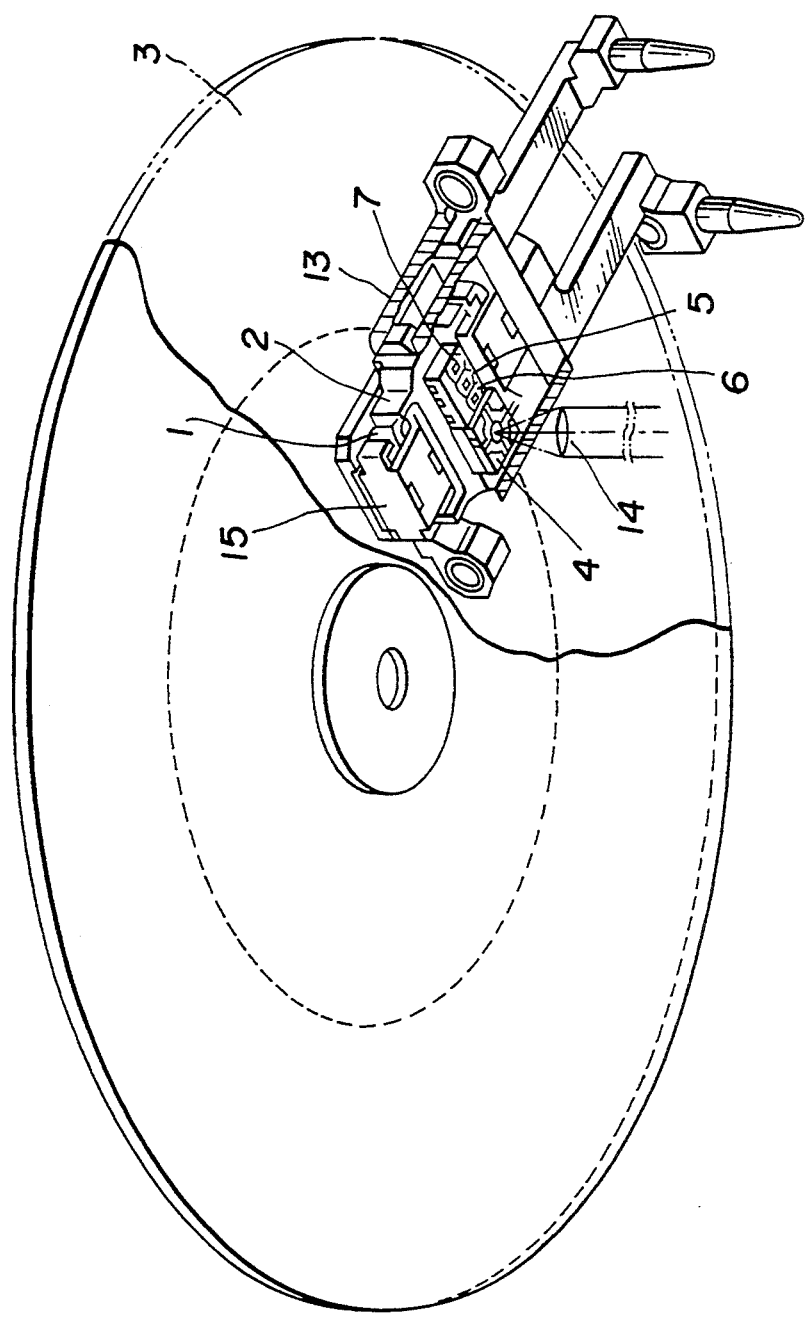
FIG. 2 is a schematic perspective view showing a construction of an embodiment of a head position controlling device according to the present invention.
Figure 3:
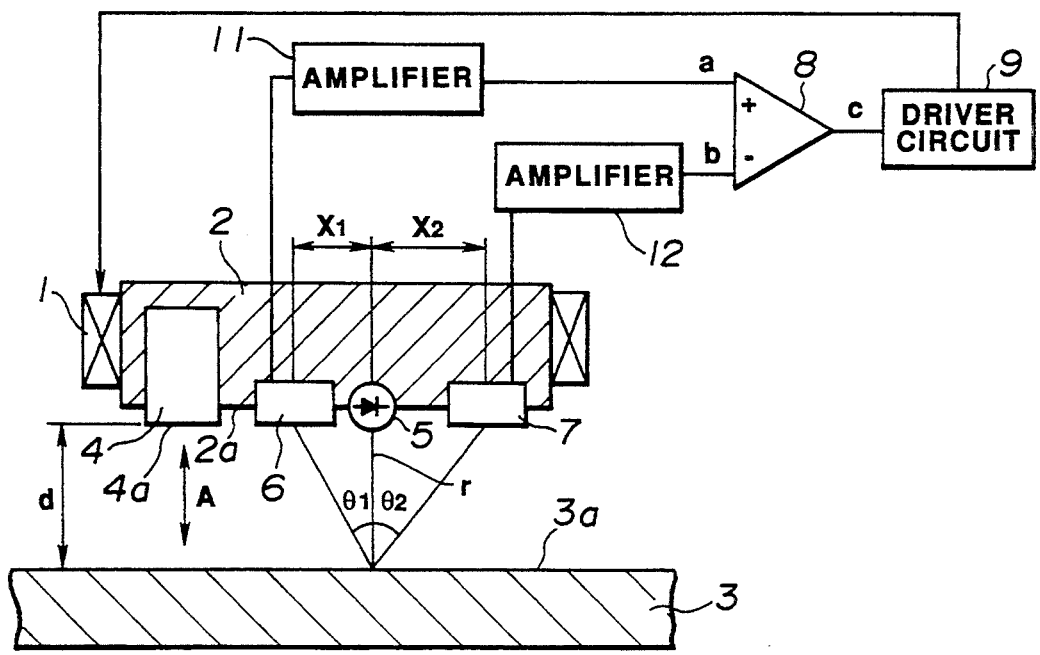
FIG. 3 is a schematic view showing the construction of the gap sensor shown in FIG. 2.

Referring to FIGS. 2 and 3, the magnetic field generating coil position controlling device according to a first embodiment of the present invention includes a bobbin 2 on the outer periphery of which a driving coil 1 is provided as driving means. A magnetic field generating coil 4 for applying a bias magnetic field corresponding to information signals in the case of a magnetic field modulation system or a predetermined bias magnetic field in the case of the light modulation system on a magneto-optical disc 3, and a gap sensor for detecting the relative distance d between the disc 4 and the coil 3, which gap sensor is constituted by a light emitting element 5 as light emitting means and light-receiving elements 6 and 7 as light-receiving means. The controlling device is arranged in opposition to an optical head, not shown, with the magneto-optical disc 3 inbetween, and is mechanically connected at its one side with the optical head, so that the controlling device is moved as one with the optical head which is moved along the radius of the magneto-optical disc. During unloading and unloading of the magneto-optical disc, the controlling device is moved translationally along a guide, not shown, in a direction away from the magneto-optical disc.

In the case of the magnetic field modulation system, the magnetic field generating coil 4 is adapted for applying a magnetic field corresponding to information signals on the magneto-optical disc 3, from above the magneto-optical disc 3 in the embodiment of FIG. 2, for inverting the direction of magnetization of a perpendicular magnetization film on a RAM region (data-recording region) on the magneto-optical disc 3, in cooperation with a laser beam irradiated from below the magneto-optical disc 3, for writing or erasing the information signals. In the case of the light modulation system, the magnetic field generating coil 4 applies a magnetic field of a predetermined strength to the magneto-optical disc 3.

This magnetic field generating coil 4 is embedded near one side edge of the bobbin 2 for perpetually maintaining a constant relative distance between the coil 4 and the magneto-optical disc 3, as indicated by arrow d in FIG. 3. A facing surface 4a of the magnetic field generating coil 4 is adapted to be exposed on a surface 2a of the bobbin 2 facing the magneto-optical disc 3.

The light-emitting element 5 is adapted for illuminating the surface 3a of the magneto-optical disc 3 facing the magnetic field generating coil 4 and may consist of, for example a light-emitting diode (LED). This light-emitting element 5 is embedded at the middle of the bobbin 2 so as to be partially exposed at the facing surface 2a of the bobbin 2. Meanwhile, the light-emitting diode 5 emits light by being supplied with a power from an external power source, not shown.

The light-receiving elements 6 and 7 receive the diffused light from the light-emitting element 5 reflected from the facing surface 3a of the magneto-optical disc 3 for generating an output voltage corresponding to the volume of the received diffused light, and may consist of, for example, a photodiode. In the present embodiment, shown in FIG. 3, these light-receiving elements 6 and 7 are arranged on both sides of the light-receiving element 5 and embedded in the bobbin 2 so as to be partially exposed on the facing surface 2a of the bobbin 2.

Figure 5:
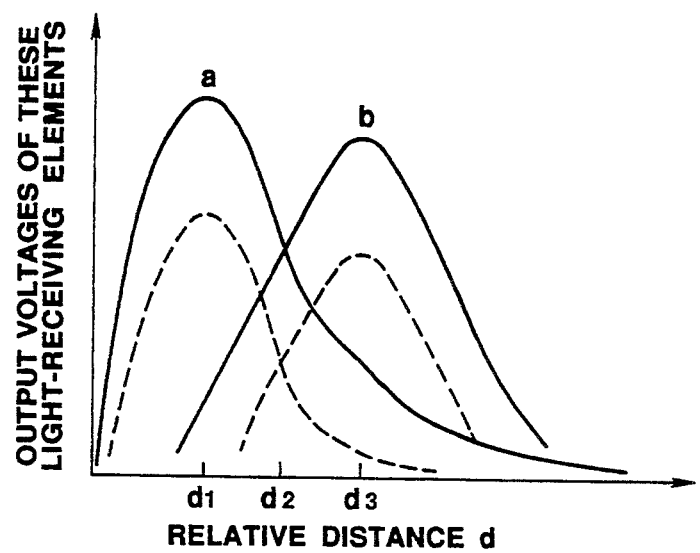
FIG. 5 is a graph showing the relation between the relative distance between the magnetic field generating coil and the magneto-optical disc in the embodiment of FIG. 3 and the output voltages from the light-receiving elements.

The light-receiving elements 6 and 7 are arranged at different distances X1, X2 from the light-emitting element 5 as a reference position. In the present embodiment, X1 is lesser than X2. In other words, the light-receiving elements 6 and 7 are arranged at different angles $\theta 1$, $\theta 2$ with respect to a perpendicular line drawn from the light-emitting element 5 to the facing surface 3a of the magneto-optical disc 3. By thus arranging the light-receiving elements 6 and 7, the elements 6 and 7 receive maximum light volumes at different distances from the facing surface 3a of the magneto-optical disc 3, such that corresponding output voltages a and b are changed, as shown in FIG. 5, as a function of the relative distance d between the magnetic field generating coil 4 and the facing surface 3a.

Thus the light-receiving element 6, arranged closer to the light-receiving element 5, receives the maximum light volume and gives the maximum output voltage a at the relative distance d1 which is lesser than the relative distance d3 at which the volume of the light received by the light-emitting element 7 disposed at a further position becomes maximum. On either sides of the relative distance d1, that is, in the directions in which the magnetic field generating coil 4 is moved towards and away from the facing surface 3a, the light volume received by the element 6 is decreased so that the corresponding output voltage a is gradually decreased from the maximum value at the relative distance d1.

On the other hand, the further the other light-receiving element 7 is away from the relative distance d1 corresponding to the maximum light volume received by the light-receiving element 6, the more becomes the light volume received by the light-receiving element 7, with the light volume received by the element 7 and hence the corresponding output voltage b becoming maximum at the aforementioned relative distance d3. As the element 7 is moved further in a direction of the increasing relative distance d3, the volume of the received light is decreased gradually and the corresponding output voltage b is also lowered.

Between the relative distance d1 corresponding to the maximum light volume received by the light-receiving element 6 and the relative distance d2 corresponding to the maximum light volume received by the light-emitting element 7, there is a relative distance d2 for which the output voltages a and b from these light-receiving elements 6 and 7 become equal to each other. This relative distance d2 is not changed by temperature characteristics of the circuit, disturbing light or fluctuations in the reflectance of the magneto-optical disc 3.

For example, if the reflectance of the magneto-optical disc 3 is changed, the light volumes received by the light-receiving elements 6 and 7 are changed with the same rate, as shown by broken lines in FIG. 5, so that the output voltages a and b become equal at the same relative distance d2.

Thus, in the present embodiment, servo is applied by taking, as the reference, the relative distance d2 for which the output voltages from these light-receiving elements 6 and 7 become equal, that is the relative distance d2 for which the level difference between the output voltages from the light-receiving elements 6 and 7 becomes zero.

Figure 6:
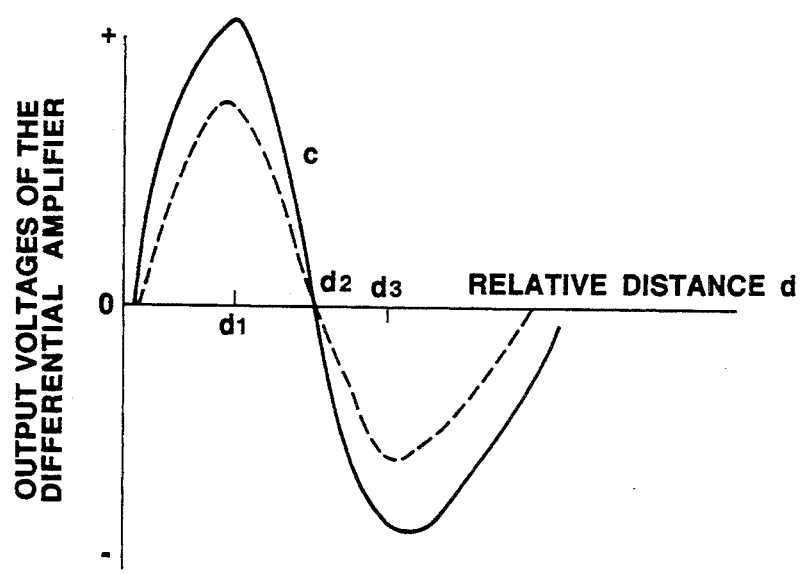
FIG. 6 is a graph showing the relation between the relative distance between the magnetic coil and the magneto-optical disc in the embodiment of FIG. 3 and the output voltage of the differential amplifier.

Thus the differential amplifier 8 is connected as detection means across the light-receiving elements 6 and 7 via amplifiers 11 and 12 for operating a difference c between the output voltages a and b from the light-receiving elements 6 and 7. As shown in FIG. 6, a characteristic curve showing the relation between the output voltage of the differential amplifier and the aforementioned relative distance d is S-shaped, with the difference c between the output voltages a and b becoming zero at the relative distance d2 and assuming positive and negative values towards the relative distance d1 and towards the relative distance d2, respectively, with the relative distance d2 as the boundary. It is noted that, if the output voltages a and b of the light-receiving elements 6 and 7 are changed at the same rate, an absolute value of the output voltage difference c is changed, as shown by a broken line in FIG. 6, however, the zero-crossing point at the relative distance d2 is not changed.

The output voltage difference c from the differential amplifier 8 is supplied to the driving circuit 9 connected to the differential amplifier 8, and a control current corresponding to the output voltage deference c is supplied from the driving circuit 9 to the driving coil 1. Since a magnetic field is applied by a permanent magnet 15 to the driving coil 1, an electro-magnetic force is generated, whereby the driving coil 1 is driven in a direction of the zero output voltage difference c, with a plate spring 13 as a fulcrum. By thus applying a servo so that the output voltage difference c from the light-receiving elements 6 and 7 is perpetually zero, the relative distance between the magnetic field generating coil 4 (i.e. magnetic head) and the magneto-optical disc 3 may be maintained constant at all times.

Figure 4:
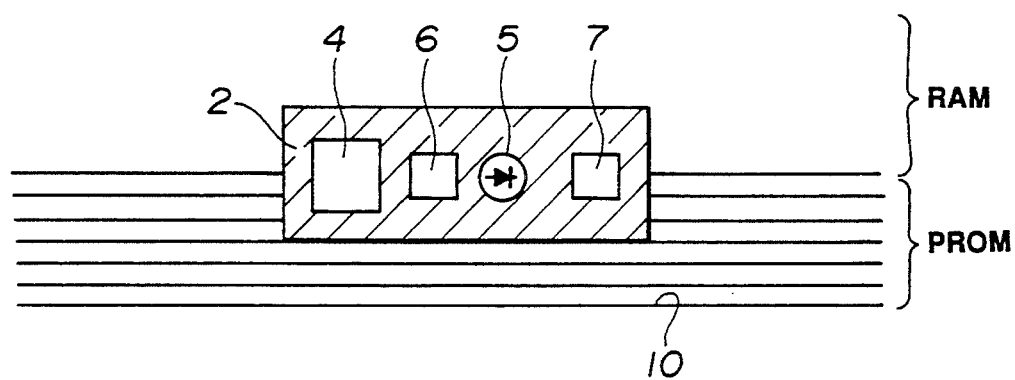
FIG. 4 is a schematic view for illustrating the direction of tracks and the gap sensor shown in FIG. 2.

In the present embodiment, the light-emitting element 5 and the light-receiving elements 6 and 7 are arrayed along the recording tracks of the magneto-optical disc 3, that is, in a direction normal to the radius along which the magnetic field generating coil 4 is moved, for thereby controlling the relative distance between the magnetic field generating coil 4 and the magneto-optical disc 3. As best shown in FIG. 4, by arraying the light emitting element 5 and the light receiving elements 6 and 7 along the same recording tracks on the magneto-optical disc 3, the light receiving elements 6 and 7 face those partial regions of a ROM (PROM) region having pit rows 10 and a RAM region or data recording region not having the pit rows, bearing the same proportion to each other, when information signals are recorded on or erased from the magneto-optical disc 3 provided with these ROM and RAM regions.

In this manner, these light-receiving elements 6 and 7 receive the diffused light from the regions having the same reflectance, so that there is no risk that the output voltage from one of the light-receiving elements be decreased drastically with respect to the output voltage from the other light-receiving element, even when the relative distance is not changed, with the result that the zero-crossing point is prevented from drifting and accurate servo may be applied with the relative distance d2 as a desired value.

Thus, with the present head position controlling device, the magnetic field generating coil 4 may be maintained at all times at a predetermined relative position from the magneto-optical disc 3 having regions with locally different reflectance values.

Figure 7:
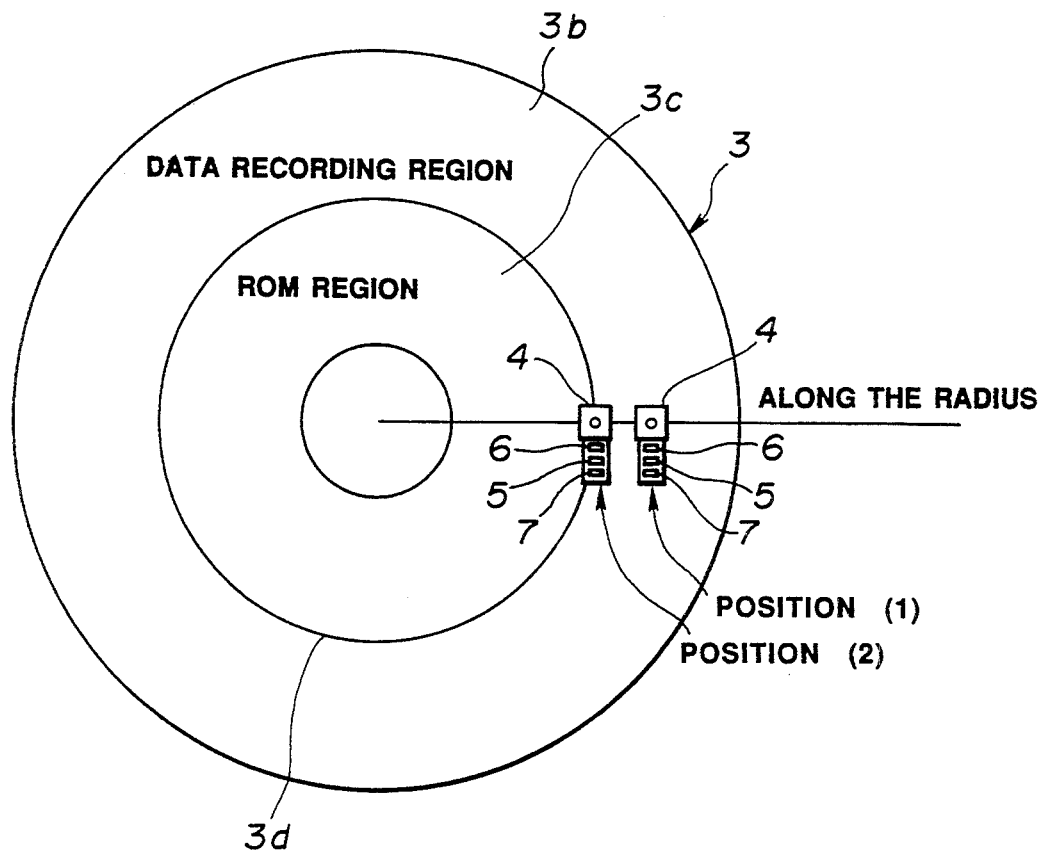
FIG. 7 is a plan view showing the relative disposition between the magneto-optical disc and the gap sensor.
Figure 8:
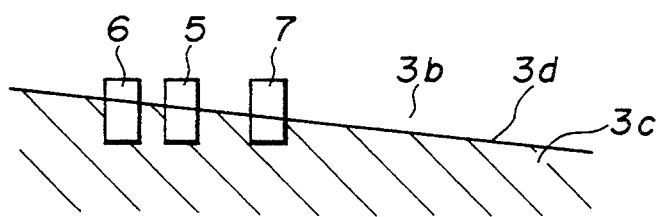
FIG. 8 is an enlarged view showing the gap sensor shown in FIG. 7 and its vicinity.

Meanwhile, the pit rows 10 are shown in FIG. 4 as being straight lines for convenience in illustration. However, effect, the magneto-optical disc 3 is circular, as shown in FIG. 7, and the pit rows 10 are formed as circles or curves, so that the boundary region 3d between the ROM region 3c and the RAM region or data-recording region 3b is also circular or curved, as shown in FIG. 6. For this reason, if the light emitting element 5 and the light receiving elements 6 and 7 are arrayed normal to the radius along which the magnetic field generating coil 4 is moved, as shown to an enlarged scale in FIG. 7, the boundary region 3d traverses the light-receiving elements 6 and 7 obliquely, but not straightforwardly.

As a result, the light receiving elements 6 and 7 face the ROM region 3c and the RAM region 3b with different areas. That is, the light receiving element 6, lying closer to the magnetic field generating coil 4, receives more light reflected from the ROM region 3c, so that, as shown by a broken line in FIG. 9, the output level becomes lower than that when the element 6 is disposed within the data recording region 3b, as shown by a solid line in FIG. 9. On the other hand, the light receiving element 7, removed to a greater extent from the magnetic field generating coil 4, receives more light reflected from the data recording region 3b, so that the output level is approximately equal to that when the element 7 is disposed in the data recording region 3b. As a result, the output c of the differential amplifier 8 is changed as shown by a broken line in FIG. 10, with the zero-crossing point shifting from a point d2 to a point d2'. That is, the differential amplifier 8 is subject to offset and is worsened in controlling accuracy. This occurs not only at the boundary between the ROM and RAM regions, but between a mirror section at an outermost region or an innermost region and the RAM or ROM region.

Figure 11:
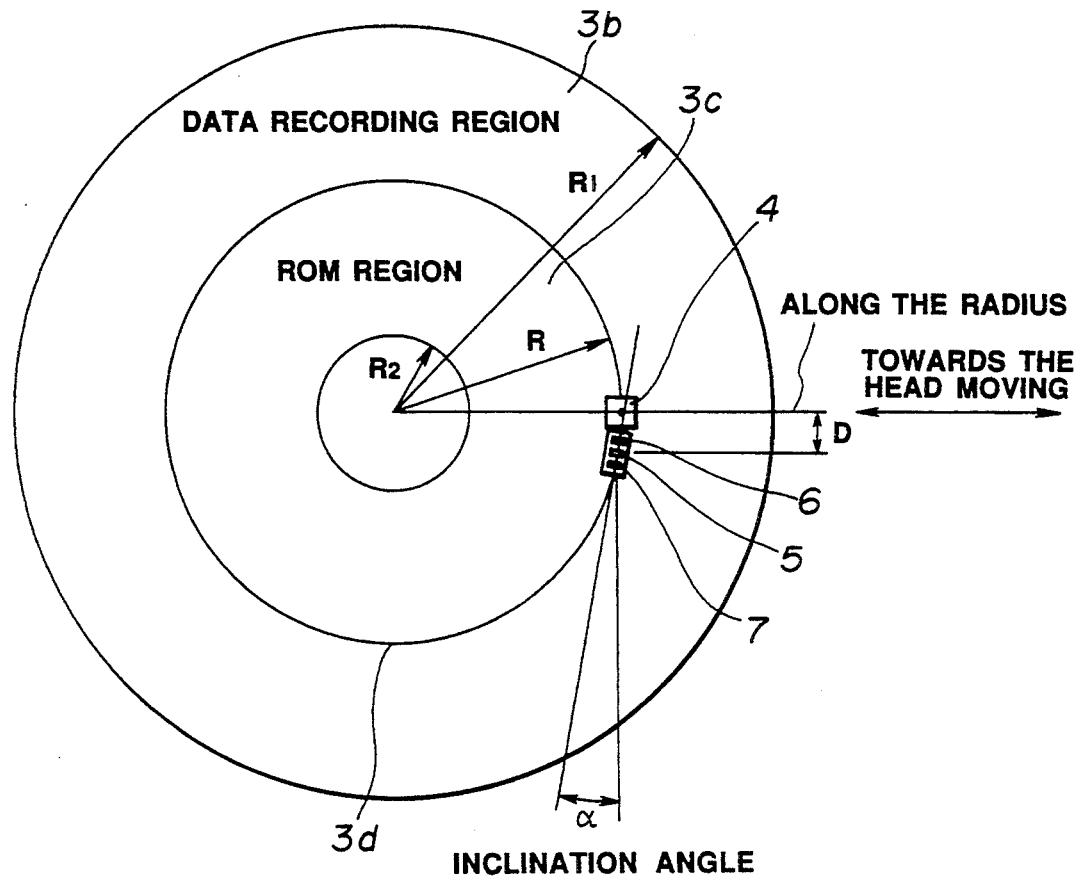
FIG. 11 is a plan view showing the construction of a modified embodiment of a gap sensor employed in the head position controlling device of the present invention.

FIG. 11 shows a modified embodiment of a magnetic field coil position controlling device of the present invention, in which, for overcoming such inconvenience, a straight line interconnecting the center of the magnetic field coil 4 and the center of the gap sensor as viewed in FIG. 11 from a plane parallel to the recording surface is inclined a predetermined acute angle $\alpha$ with respect to the direction of a tangential line drawn to a track on which the magnetic field generating coil 4 is disposed, that is, to the direction normal to the radius along which the magnetic field generating coil 4 is moved.

Figure 12:
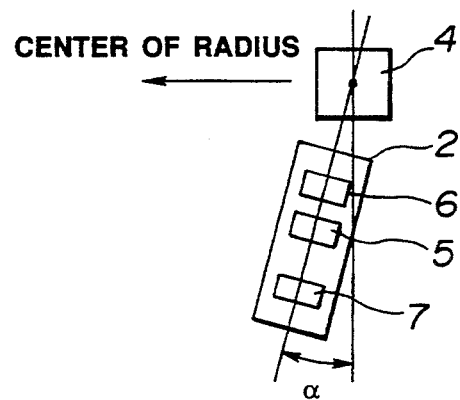
FIG. 12 is an enlarged view showing the gap sensor shown in FIG. 11 and its vicinity.
Figure 11:
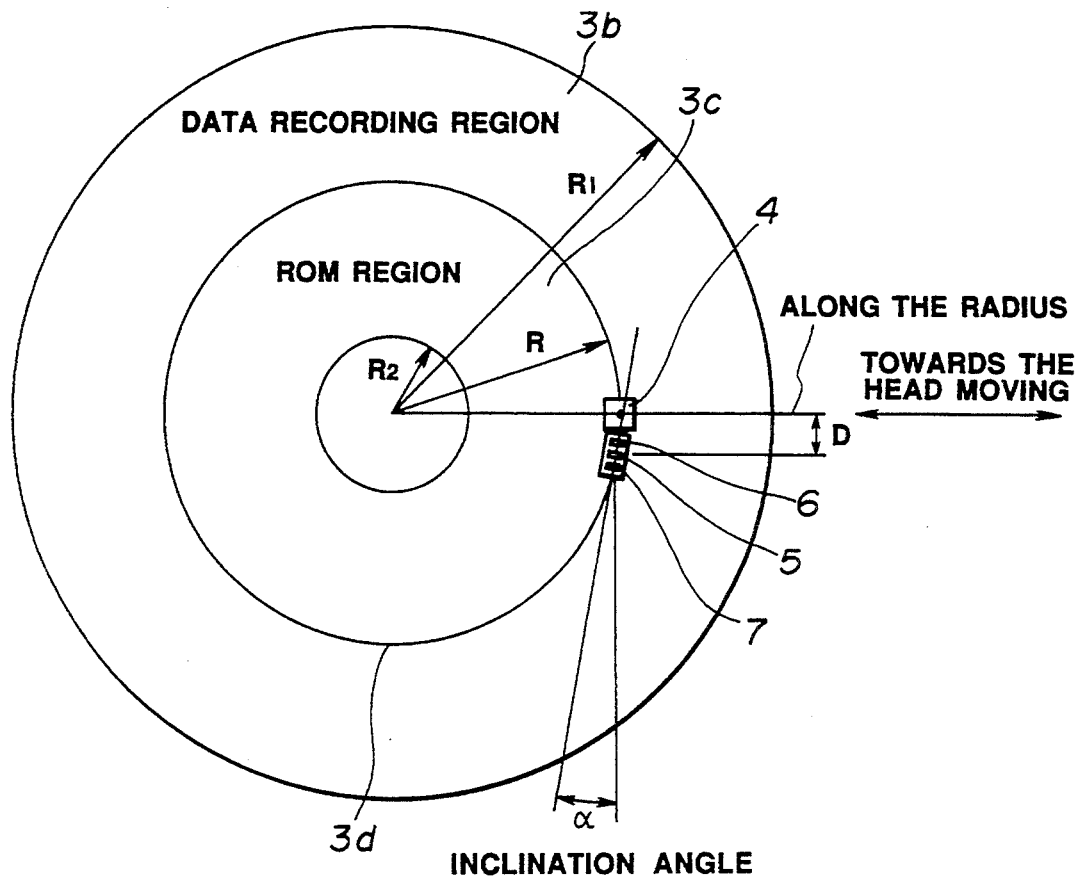
Figure 12:
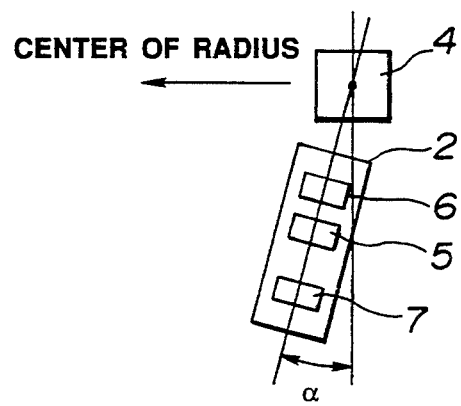

FIG. 12 shows, to an enlarged scale, the relative disposition of the gap sensor with respect to the magnetic field generating coil 4. In the present embodiment, the light emitting element 5 and the light receiving elements 6 and 7 are arranged in parallel within the gap sensor, and the gap sensor in its entirety is inclined at an angle $\alpha$ with respect to the tangential line drawn to the track.

Figure 13:
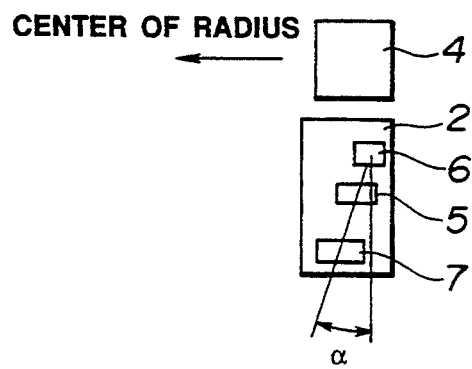
FIG. 13 is a schematic view showing the construction of the gap sensor employed in the head position controlling device of the present invention.

Alternately, as shown in FIG. 13, a straight line interconnecting the centers of the light emitting element 5 and the light receiving elements 6 and 7 may be inclined an angle $\alpha$ with respect to the tangential line drawn to the track within the inside of the gap sensor, without inclining the gap sensor in its entirety with respect to the magnetic field generating coil 4.

If the radius of the boundary region 3d is R and the distance between the centers of the magnetic field generating coil 4 and the gap sensor is D, the angle $\alpha$ is set so that $$\alpha = D/R$$

Therefore, if the gap sensor is positioned at the boundary region 3d between the data recording region 3b and the ROM region 3c, the line interconnecting the centers of the respective elements of the gap sensor is approximately parallel to the track direction. As a result, the reflectance of an effective reflecting region on the magneto-optical disc 3 reflecting the light towards the light receiving element 6, that is, the area ratio between the data recording region 3b and the ROM region 3c, is approximately equal to the reflectance of an effective reflecting region on the magneto-optical disc 3 reflecting the light towards the light receiving element 7, that is, the area ratio between the data recording region 3b and the ROM region 3c. Thus the output of the differential amplifier 8 is changed as shown by a broken line in FIG. 6, with the zero-crossing point d2 remaining unchanged.

Figure 14:
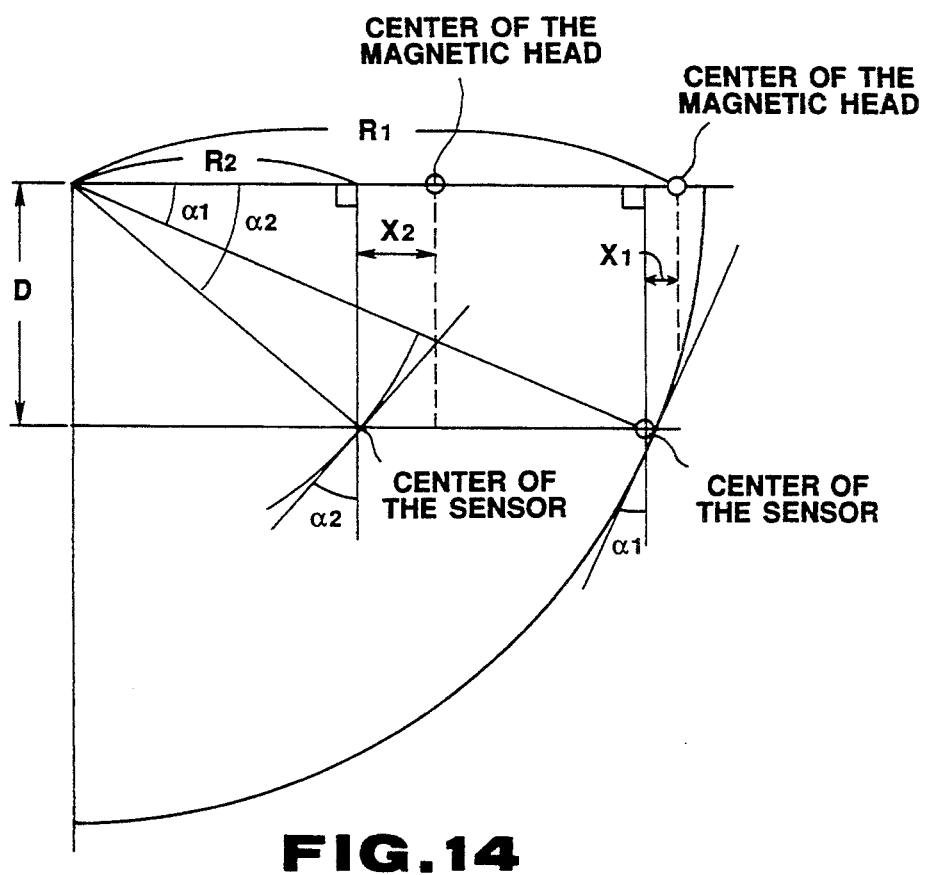
FIG. 14 is a diagrammatic view showing the relation between the range of movement of the magnetic head and the center position of the gap sensor.

If the radial position of the boundary region 3c between the data recording region 3a and the ROM region 3b is fixed, or prescribed, such as by standards, the angle $\alpha$ is set in association with the radial position. However, if the radial position is not fixed, the center of the gap sensor is removed a distance D along a tangential line drawn to the track (y-axis) or along the direction normal to the radius R of the magneto-optical disc 3 with respect to the center of the magnetic head or of the magnetic field generating coil 4 transferred along the radius of the magneto-optical disc 3 or x-axis, so that the optimum position and inclination o of the gap sensor along the radius of the magneto-optical disc 3 differ with the value of the radius R, that is, with the position of the magnetic field generating coil 4 along the radius of the magneto-optical disc 3, as shown in FIG. 14.

If, in this figure, the maximum and minimum values of the radius accessed by the magnetic head are R1 and R2, respectively, the angle the center of the magnetic head makes with the center of the gap sensor is $\alpha 1$ for $R = R1$ and $\alpha 2$ for $R = R2$, and the distance between the center of the gap sensor and the center of the magnetic head is x1 for $R = R1$ and x2 of $R = R2$, the following equations hold:

$$\sin \alpha 1 = D/R1$$

$$\sin \alpha 2 = D/R2$$

$$x1 = R1(1 - \cos \alpha 1)$$

$$x2 = R2(1 - \cos \alpha 2)$$

For achieving offset equilibrium for the entire accessing range of the magnetic head, it suffices if the angle $\alpha$ and the distance x are set to respective optimum values at the mid radial position of the accessing range. If the value of the radius is R0 and the distance in the y-direction between the center of the magnetic head and the center of the gap sensor is D, the angle $\alpha 0$ which the magnetic head makes with the enter of the gap sensor and the distance x0 between the center of the magnetic head and the center of the gap sensor are given by $$\alpha 0 = \sin^{-1}(D/R0)$$

$$x0 = R0\{1 - \cos[\sin^{-1}(D/R0)]\}$$

Alternatively, from the viewpoint of the mean value of the optimum values at the outermost region and that at the innermost region, the angle may be set so that $$\alpha 0 = (D/2)(1/R1 + 1/R2)$$

Although a preferred embodiment of the head position controlling device of the present invention has been explained hereinabove, the present invention is not limited to the embodiment shown herein, but may encompass a variety of modifications.

Figure 15:
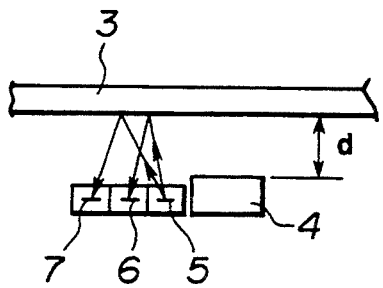
FIG. 15 is a schematic view showing the construction of another modified embodiment of the gap sensor employed in the head position controlling device of the present invention.
Figure 16:
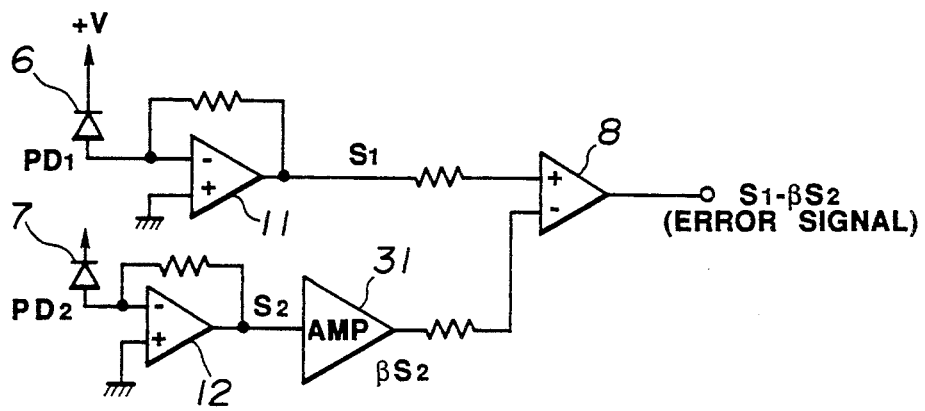
FIG. 16 is a circuit diagram showing the construction of a circuit employed in the embodiment of FIG. 15.
Figure 17:
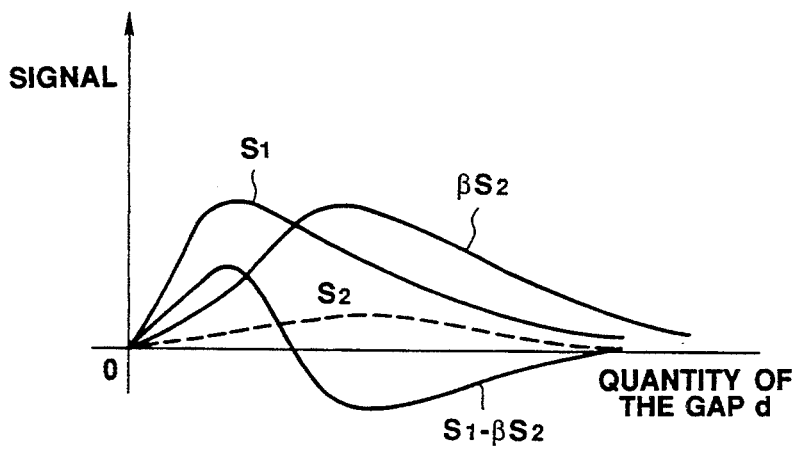
FIG. 17 is a graph showing characteristics of the circuit shown in FIG. 16.

For example, instead of arraying the light-receiving elements 6 and 7 on both sides of the light emitting element 5, as in the preceding embodiments, the light emitting element 5 and the light receiving elements 6 and 7 may also be arrayed in this order, as shown in FIG. 15, In view of the different distances to the light receiving elements 6 and 7 from the light emitting element 5, servo is similarly applied with the relative distance d2 as the desired value. However, in this case, the output S2 of the light receiving element 7 becomes smaller than the output S1 of the light receiving element 6, as shown in FIG. 17. Thus, as shown in FIG. 16, when the output of the light receiving element 7 is amplified by the amplifier 11 to produce the output S1 which is supplied to the differential amplifier 8, it is necessary to amplify the output of the light receiving element 7 by amplifier 12 corresponding to amplifier 11 to produce an output S2, to amplify the output S2 further by an amplifier 31 to produce an output βS2 which is supplied to the deferential amplifier 8. In this manner, an error signal (S1−βS2) driving the driver coil 1 from the deferential amplifier 8 is produced.

Figure 18:
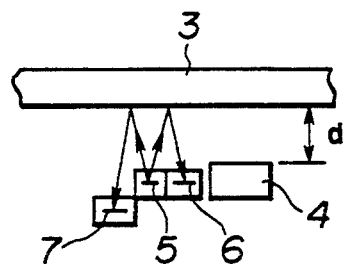
FIG. 18 is a schematic view showing yet another modified embodiment of the gap sensor employed in the head position controlling device of the present invention.
Figure 19:
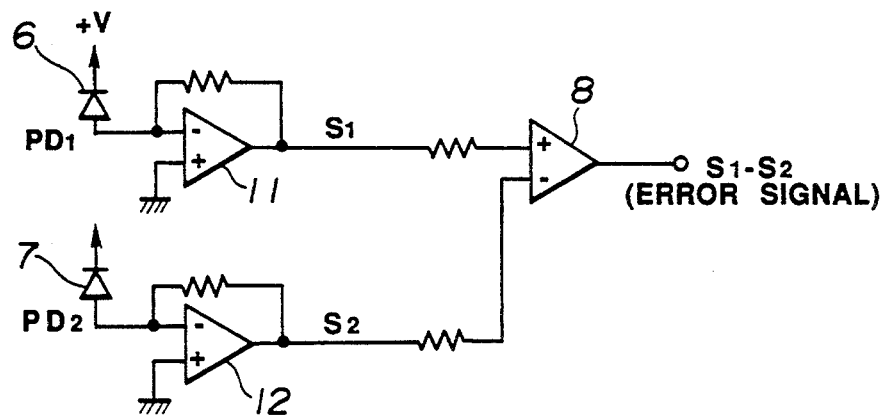
FIG. 19 is a circuit diagram showing the construction of c circuit employed in the circuit shown in FIG. 17.
Figure 20:
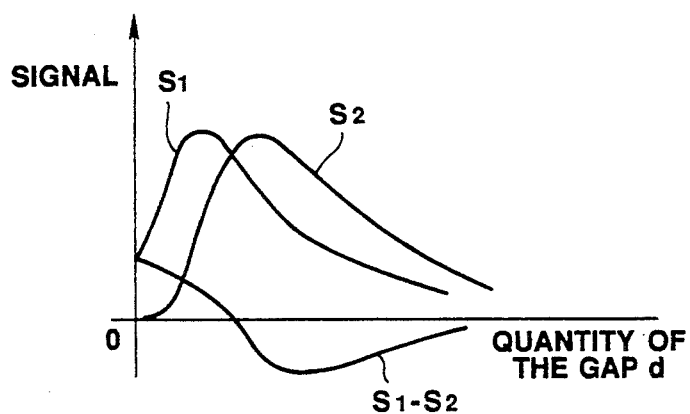
FIG. 20 is a graph showing characteristics of the circuit shown in FIG. 18.

In a modification shown in FIG. 18, the light receiving elements 6 and 7 are arrayed parallel to the magneto-optical disc 3 in alignment with the magneto-optical disc 3, while the light receiving element 7 is arrayed at an offset position with respect to the light receiving element 6. In this case, the outputs S1 and S2 from the light receiving elements 6 and 7 are substantially at the same level, as shown in FIG. 20. Thus the outputs of the light receiving elements 6 and 7 may be directly supplied via amplifiers 11 and 12 to the differential amplifier 8, so that the amplifier 31 in FIG. 16 may be dispensed with.

Although the light emitting element 5 and the light receiving elements 6 and 7 are fixed at predetermined angles in the above embodiments, these angles may be changed as a function of the radial positions.

The present invention may also be applied not only to position controlling of the magnetic field generating coil, but also to position controlling of optical or other head types.

In the first aspect of the present invention, since the light emitting means and the light receiving means are arrayed along the recording track direction of the disc, light receiving means are arrayed in effect in opposition to the same reflective region to prevent fluctuations in the zero-crossing point of the level difference of the output voltages from the light receiving means.

Thus, with the head position controlling device of the present invention, servo may be stably applied with the predetermined relative distance between the head and the disc as the desired value and the head may be maintained at all times at a predetermined relative position from a disc having regions with different reflectance values within the same plane to enable stable recording and erasure of the information signals.

Since there is no necessity of providing separate complex circuits, the arrangement of the device may be simplified and reduced in costs.

In the second aspect of the present invention, the two light receiving elements may be arranged at an inclined position with respect to the radial direction of the disc for realizing highly accurate position control.

What is claimed is:

1. A position controlling device for maintaining a constant relative distance between a magneto-optical disc and an external magnetic field generating device for supplying an external magnetic field for recording information signals on the magneto-optical disc or erasing information signals recorded on the magneto-optical disc, said position controlling device comprising:
light emitting means for illuminating a facing surface of the magneto-optical disc from the external magnetic field generating device with a diffused light,
a pair of light receiving elements for receiving the diffused light once irradiated on the facing surface of the magneto-optical disc from said light emitting means and reflected from said facing surface for generating an output corresponding to the volume of the received light, and
driving means for driving said external magnetic field generating device in a direction normal to the facing surface of the magneto-optical disc responsive to an output from said pair of light receiving elements,
wherein said light emitting means and said light receiving elements are arrayed over the facing surface of the magneto-optical disc and are intersected by a hypothetical line which is parallel to the facing surface and passes through the external magnetic field generating device, the hypothetical line forming an acute angle with respect to a radial direction traveled over the magneto-optical disc by the external magnetic field generating device if viewed from the plane parallel to the facing surface and so that the length of a light path of the diffused light reflected from the facing surface of the magneto-optical disc to one of the light receiving elements is longer than that to the other of the light receiving elements.

2. The position controlling device as claimed in claim 1 further comprising: signal generating means for generating a signal corresponding to the relative distance between the external magnetic field generating means and the magneto-optical disc, the signal generating means detecting a difference between output signals from the pair of the light receiving means, the output of said signal generating means being supplied to said driving means.

3. The position controlling device as claimed in claim 1 wherein said pair of the light receiving elements are arrayed on opposite sides of said light emitting means with said light emitting means in-between the light receiving elements.

4. A position controlling device for maintaining a constant relative distance with respect to a magneto-optical disc of an external magnetic field generating device for supplying an external magnetic field for recording information signals on the magneto-optical disc or erasing information signals recorded on the magneto-optical disc, said position controlling device comprising:
light emitting means for illuminating a facing surface of the external magnetic field generating device to said magneto-optical disc with a diffused light,
a pair of light receiving elements for receiving the diffused light once irradiated on the facing surface of the magneto-optical disc from said light emitting means and reflected from said facing surface for generating an output corresponding to the volume of the received light,
signal processing means for generating a drive signal which is calculated on the basis of a difference between the output signals from said pair of light receiving elements; and
driving means for driving said external magnetic field generating device in a directions normal to the facing surface of the magneto-optical disc responsive to the drive signal outputted from said signal processing means,
wherein said light emitting means and said light receiving elements are intersected by a hypothetical line which is parallel to the facing surface, passes through the external magnetic field generating device and forms an oblique angle with respect to a radial direction traveled over the magneto-optical disc by the external magnetic field generating device if viewed from a plane parallel to the facing surface, so that the length of a light path of the diffused light reflected from the facing surface of the magneto-optical disc to one of the light receiving elements is longer than that to the other of the light receiving elements.

5. A position controlling device for maintaining a constant relative distance between a magneto-optical disc and an external magnetic field generating device for supplying an external magnetic field for recording information signals on the magneto-optical disc or erasing information signals recorded on the magneto-optical disc and moving across a recording track on the magneto-optical disc, said position controlling device comprising:

light emitting means for illuminating a facing surface of the magneto-optical disc from the external magnetic field generating device with a diffused light, a pair of light receiving elements for receiving the diffused light once irradiated on the facing surface of the magneto-optical disc from said light emitting means and reflected from said facing surface for generating an output corresponding to the volume of the received light, driving means for driving said external magnetic field generating device in a direction normal to the facing surface of the magneto-optical disc responsive to an output from said pair of light receiving elements, wherein said light emitting means and said light receiving elements are arrayed over the facing surface of the magneto-optical disc along a hypothetical line which is oblique with respect to a radial direction traveled over the magneto-optic disc by the external magnetic field generating device, if viewed from a plane parallel to the facing surface, and so that the length of a light path of the diffused light reflected from the facing surface of the magneto-optical disc to one of the light receiving elements is longer than that to the other of the light receiving elements, the hypothetical line passing through the external magnetic field generating device if viewed from a plane parallel to the facing surface.

* * * * *